W. J. CROW.
Water-Closet.
No. 159,906.
Patented Feb. 16, 1875.
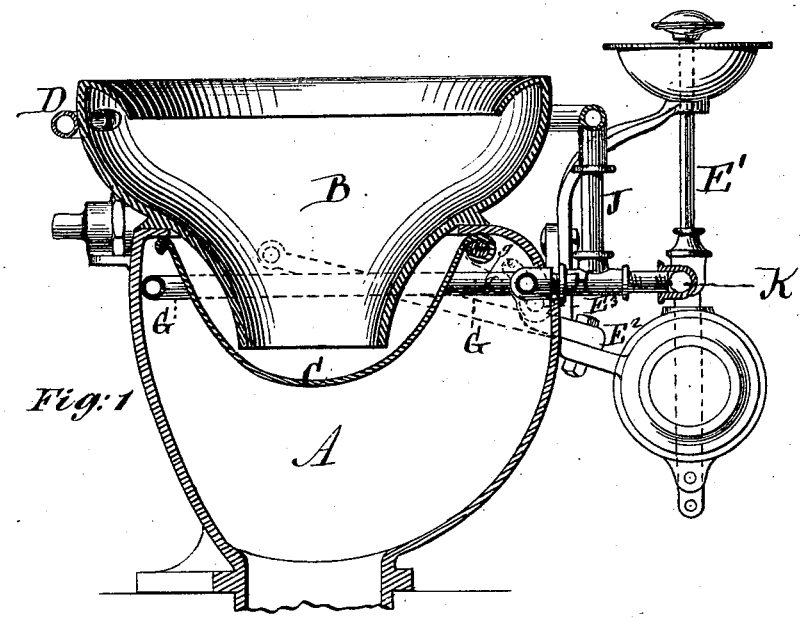
Fig: 1
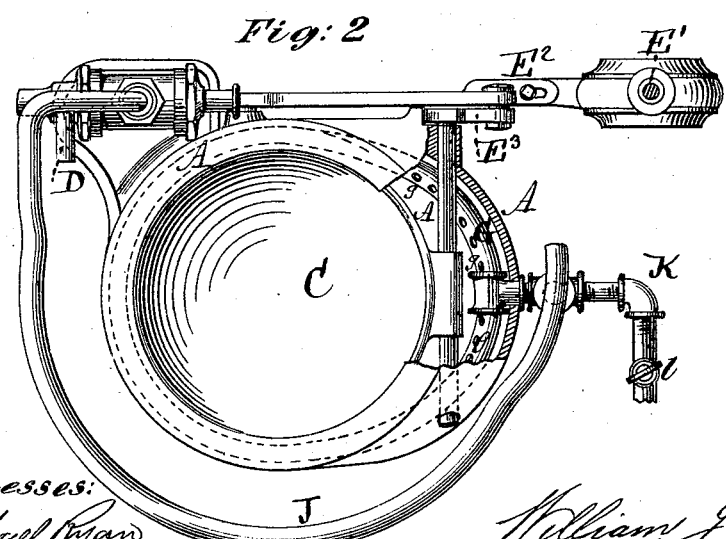
Fig: 2
Witnesses:
Michael Ryan
Fred. Haynes
William J. Crow
by his Attorneys
Brown & Allen

UNITED STATES PATENT OFFICE.

WILLIAM J. CROW, OF NEW YORK, N. Y., ASSIGNOR OF ONE-HALF HIS RIGHT TO JOSEPH A. MACDONALD, OF SAME PLACE.

IMPROVEMENT IN WATER-CLOSETS.

Specification forming part of Letters Patent No. 159,906, dated February 16, 1875; application filed November 19, 1874.

*To all whom it may concern:*

Be it known that I, WILLIAM J. CROW, of the city, county, and State of New York, have invented a new and useful Improvement in Water-Closets; and I do hereby declare that the following is a full, clear, and exact description thereof, reference being had to the accompanying drawing, forming part of this specification.

My invention relates to the class of water-closets known as pan-closets; and it consists in a pipe arranged under the bowl and around the exterior of the pan, for the purpose of washing the interior of the receiver and the exterior of the pan and bowl, and at the same time keeping the lower trap properly supplied.

In the accompanying drawing, Figure 1 is a central vertical section of a receiver, bowl, and pan with my improvement attached. Fig. 2 is a top view of the same with the bowl removed.

A represents the receiver, B the bowl, and C the pan, of an ordinary pan-closet, the bowl receiving water at the top from a pipe, D, in the usual manner, said pipe being provided with a valve, which, with the pan, is operated by a series of levers, $E^1$ $E^2$ $E^3$, of the usual construction. G represents a pipe arranged around the interior of the receiver A, near the top, in the form of a ring. This pipe is attached to and receives water from a pipe, H, which passes through the receiver A, and communicates with the pipe D through a conducting-pipe, J, so as to be supplied with water by the operation of the valve at the same time that the pan C is supplied. The pipe G is provided with perforations $g$, through which the water escapes in streams or jets. The pipe G is also connected with a pipe, K, which communicates directly with the main water-supply pipe, and is provided with a stop-cock, $l$, which may be turned by hand in order to supply the pipe G with water independently of the pipe D and the valve.

In the operation of my invention, the water issuing from the pipe G washes the inside of the receiver and the outside of the pan and lower part of the bowl, thus keeping those parts clean, and preventing the outside of the pan from becoming corroded by ammonia.

Another advantage resulting from this invention is as follows: In pan-closets of the ordinary construction it sometimes happens that when the pan is emptied the draft in the waste-pipe is sufficient to exhaust the water in the lower trap, so that when the pan is returned to its horizontal position under the bowl the lower trap is left without water. In my invention, the water issuing from the pipe G overcomes this difficulty, as it insures the lower trap being properly supplied.

The pipe G, instead of being an independent pipe, as described and illustrated, may consist of a pipe cast or otherwise formed around the interior of the receiver or exterior of the pan, or may be formed on the bowl, and the introduction of the water to the inside of the receiver and outside of the pan need not be confined to the mode above described, as it may be supplied through the horizontal spindle upon which the pan swings, which spindle would in such case be made hollow and communicate with a hollow rim around the pan; or the pipe which supplies the water may have a "fan" on the end, instead of being perforated.

What I claim as new, and desire to secure by Letters Patent, is—

In a water-closet, a water-pipe placed within the receiver and outside of the pan, substantially as and for the purpose shown and described.

WILLIAM J. CROW.

Witnesses:
HENRY T. BROWN,
MICHAEL RYAN.